United States Patent
Kim et al.

(10) Patent No.: US 8,355,719 B2
(45) Date of Patent: Jan. 15, 2013

(54) METHOD FOR ESTABLISHING BASE STATION INFORMATION OF FEMTOCELL BASE STATION, AND FEMTOCELL BASE STATION APPLIED THEREWITH

(75) Inventors: Jun Sik Kim, Daejeon (KR); Sang Chul Oh, Daejeon (KR); Hyung Deug Bae, Daejeon (KR); Seung-Que Lee, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 153 days.

(21) Appl. No.: 12/909,532

(22) Filed: Oct. 21, 2010

(65) Prior Publication Data

US 2011/0143737 A1 Jun. 16, 2011

(30) Foreign Application Priority Data

Dec. 15, 2009 (KR) .................... 10-2009-0124581

(51) Int. Cl.
*H04W 4/00* (2009.01)
(52) U.S. Cl. ............... 455/435.2; 455/411; 455/418; 455/561
(58) Field of Classification Search ........... 455/422.1, 455/435.1–435.3, 515, 411, 418, 423, 424, 455/561; 370/310–350
See application file for complete search history.

(56) References Cited

U.S. PATENT DOCUMENTS

| | | | |
|---|---|---|---|
| 2007/0097939 A1* | 5/2007 | Nylander et al. | 370/338 |
| 2008/0220779 A1 | 9/2008 | Bose | |
| 2008/0261563 A1 | 10/2008 | Drevon et al. | |
| 2009/0082010 A1* | 3/2009 | Lee et al. | 455/424 |
| 2009/0092122 A1 | 4/2009 | Czaja et al. | |

FOREIGN PATENT DOCUMENTS

| | | |
|---|---|---|
| EP | 1983771 A1 | 10/2008 |
| KR | 1020090037636 | 4/2009 |
| KR | 1020090112911 | 10/2009 |

* cited by examiner

*Primary Examiner* — Ajit Patel
*Assistant Examiner* — Erica Navar
(74) *Attorney, Agent, or Firm* — Nelson Mullins Riley & Scarborough LLP; EuiHoon Lee, Esq.

(57) ABSTRACT

A method for setting base station information of a femtocell base station includes: upon a power application to the femtocell base station, setting all or some of terminals accessing the femtocell base station as console terminals; and receiving a radio environment parameter related to radio environment around each console terminal from the console terminals through a communication interface unit. The method further includes setting the base station information including an operation mode of the femtocell base station and a cell identifier of a femtocell covered by the femtocell base station based on the first radio environment parameter.

8 Claims, 7 Drawing Sheets

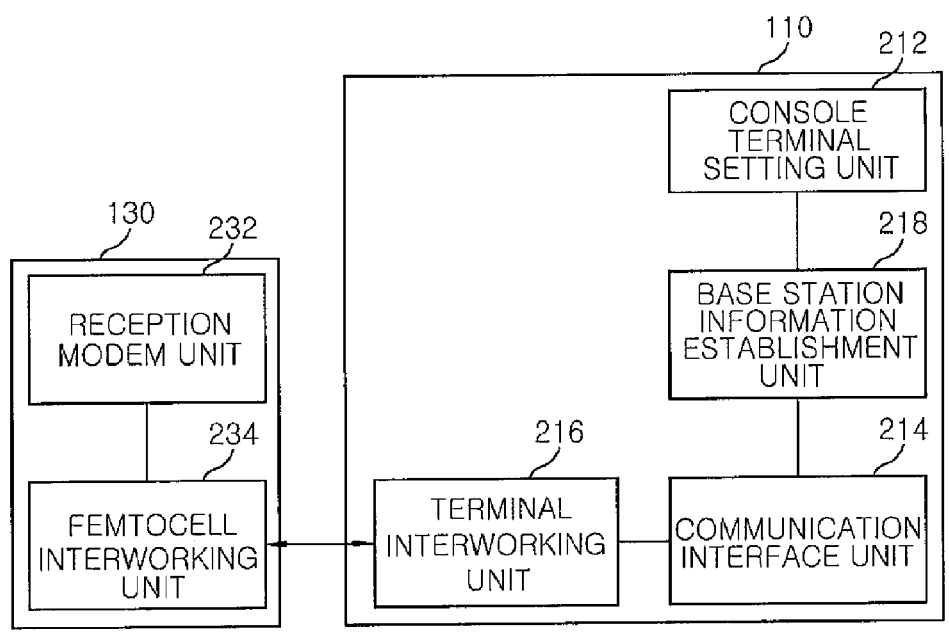
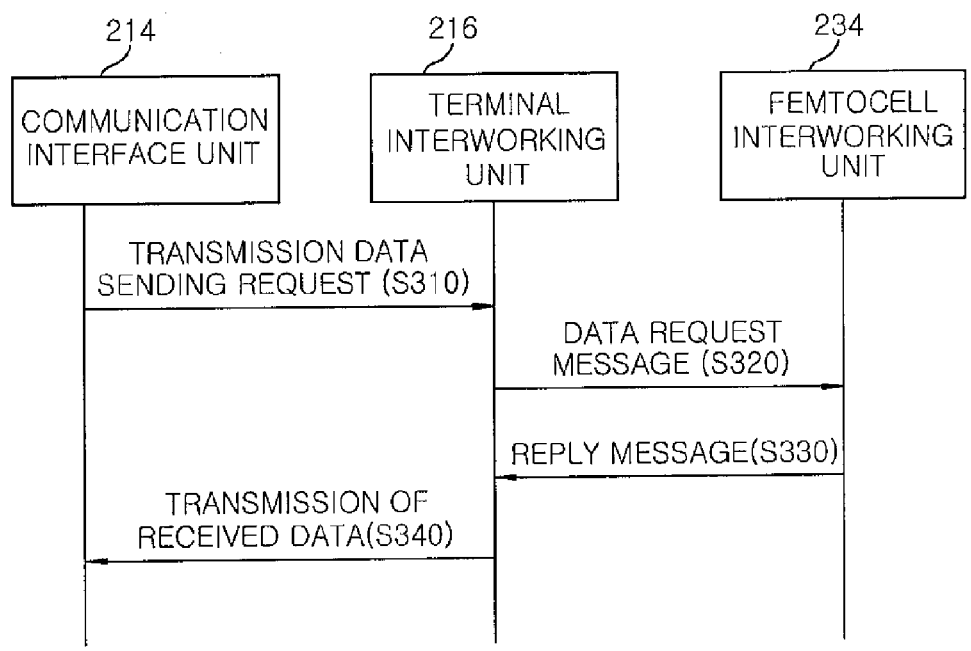

METHOD FOR ESTABLISHING BASE STATION INFORMATION OF FEMTOCELL BASE STATION, AND FEMTOCELL BASE STATION APPLIED THEREWITH

CROSS-REFERENCE(S) TO RELATED APPLICATION

The present invention claims priority of Korean Patent Application No. 10-2009-0124581, filed on Dec. 15, 2009, which is incorporated herein by reference.

FIELD OF THE INVENTION

The present invention relates to a method for establishing base station information of a femtocell base station and the femtocell base station applied with the method, and, more particularly, to a method of establishing base station information by receiving radio environment parameters related to the radio environment around a console terminal accessing a femtocell base station from the console terminal, and to the femtocell base station which is applied with the method.

BACKGROUND OF THE INVENTION

With the increasing demand for high-speed and large-capacity services in the mobile communication technique, radio data service equipped with high transmission capacity such as 3rd Generation Partnership Project (3GPP) Long Term Evolution (LTE) mobile communication systems has been provided. In compliance with this tendency, a femtocell which provides a service to a small number of subscribers at home or at an office has been proposed.

A femtocell is a concept contrasted with a macrocell which is a service area covered by one base station in conventional cellular mobile communication to cover a relatively smaller area than that of the macrocell. Generally, a femtocell base station which covers a femtocell is a very small base station installed indoors such as at home or at the office, unlike a macro base station which covers a macrocell. Further, a femtocell base station enables a mobile communication service area to be expanded, service quality to be improved, and the capacity of a mobile communication base station to be increased while enabling high-speed and large-capacity data transmission and providing inexpensive and various types of services by coupling with an existing network.

For example, a femtocell base station which covers an area having a radius of 10 to 20 m is installed indoors to be connected to a wired Internet Protocol (IP) network, thus providing various types of services coupled with wired/wireless communication using mobile phones or home networks. Further, since data can be transmitted from the femtocell base station to a mobile switching center without requiring a separate indoor repeater, network install costs can be reduced.

A femtocell can be installed and operated by a user, and therefore a femtocell base station is installed without any forethought depending on the user's necessity regardless of the design of cells by a service provider. Therefore, when a femtocell is additionally installed, self-setting of base station configuration and self-optimization of base station operations are required. Here, the self-setting of base station configuration includes initialization of the base station by generating radio environment parameters based on construction of the femtocell, and identification of adjacent base stations, setup and registration of the relationship with the adjacent base stations, and connection setup with a core network before the base station is operated. The self-optimization of base station operations includes controlling of a signal intensity of base station and calculation of optimal handover parameters on the basis of a signal type and traffic between neighboring base stations.

The newly installed femtocell base station needs to perform a selection of the frequency and channel and a control of power in an initialization stage so that interference with adjacent base stations, e.g., a macro base station located outdoors, can be avoided as much as possible, and also needs to be set so that femtocell identifiers are not duplicated for smooth handover.

However, the conventional femtocell base station establishment methods and apparatuses have difficulties to make a trade-off between effectively establishing base station information depending on the surrounding radio environment, and realizing the small size of a femtocell base station and keeping costs down, when the femtocell base station is installed.

SUMMARY OF THE INVENTION

Therefore, the present invention provides a method for establishing base station information including an operation mode of a femtocell base station and a cell identifier of a femtocell covered by the femtocell base station by receiving radio environment parameters related to the radio environment around a console terminal accessing the femtocell base station from the console terminal, and also provide the femtocell base station applied with the method.

In accordance with an aspect of the present invention, there is provided a method for establishing base station information of a femtocell base station. The method includes: upon a power application to the femtocell base station, setting all or some of terminals accessing the femtocell base station as console terminals; receiving a radio environment parameter related to radio environment around each console terminal from the console terminals through a communication interface unit; and establishing the base station information including an operation mode of the femtocell base station and a cell identifier of a femtocell covered by the femtocell base station based on the first radio environment parameter.

In accordance with another aspect of the present invention, there is provided a femtocell base station including: a console terminal setting unit for, upon a power application to the femtocell base station, setting all or some of terminals accessing the femtocell base station as console terminals; a communication interface unit for communicating with each of the console terminals; a terminal interworking unit for receiving a radio environment parameter related to radio environment around the console terminal from the console terminals through the communication interface unit; and a base station establishment unit for establishing base station information including an operation mode of the femtocell base station and a cell identifier of a femtocell covered by the femtocell base station, based on the first radio environment parameter.

BRIEF DESCRIPTION OF THE DRAWINGS

The above and other objects and features of the present invention will become apparent from the following description of preferred embodiments given in conjunction with the accompanying drawings, in which:

FIG. 2 is a diagram schematically showing a construction of a femtocell base station and a console terminal in accordance with the embodiment of the present invention;

FIG. 3 is a diagram showing the flow of messages required to acquire radio environment parameters between the femtocell base station and the console terminal in accordance with the embodiment of the present invention;

DETAILED DESCRIPTION OF THE EMBODIMENTS

Hereinafter, embodiments of the present invention will be described in detail with reference to the accompanying drawings which form a part hereof.

Figure 1:
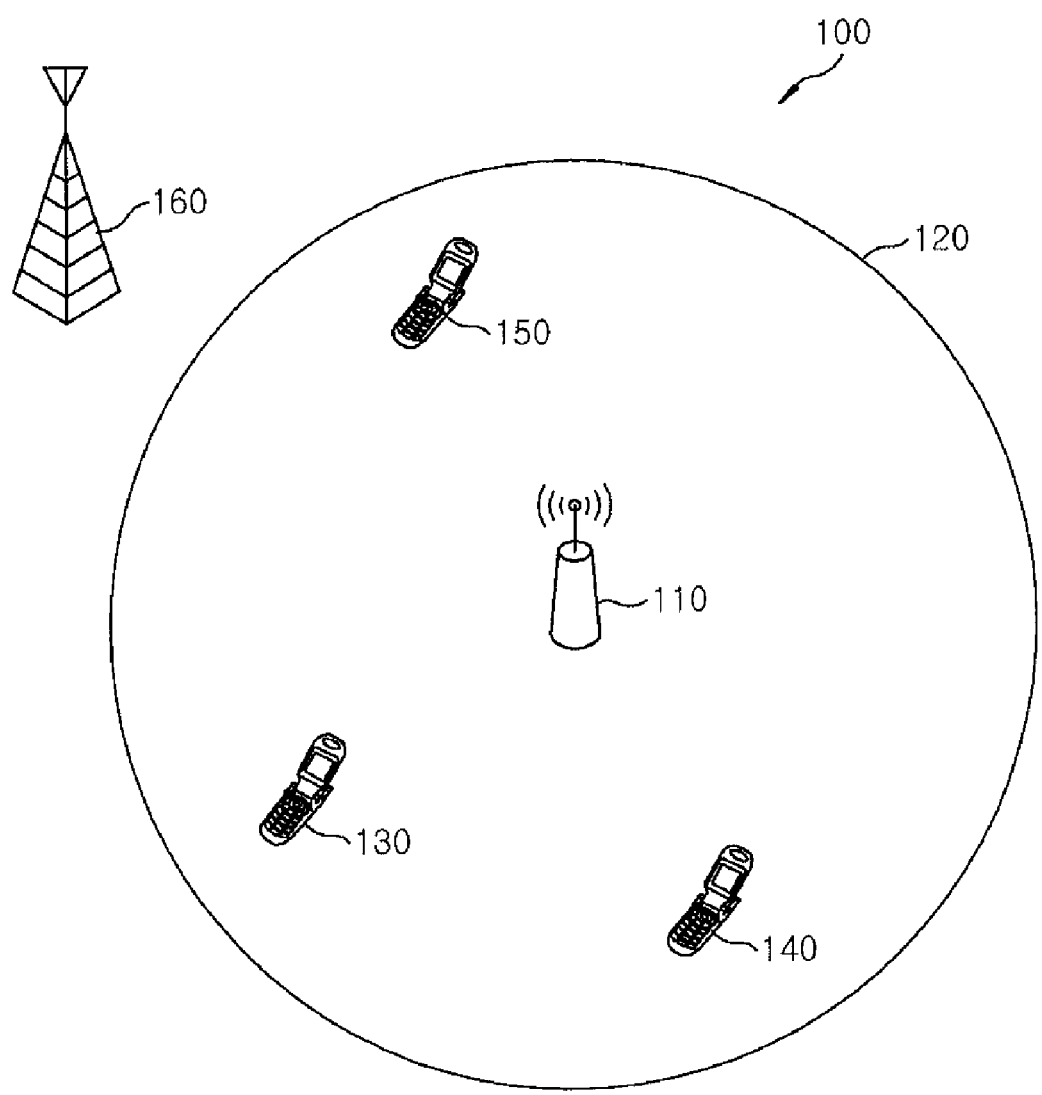
FIG. 1 is a diagram schematically showing a construction of a femtocell in a mobile communication system in accordance with an embodiment of the present invention.

FIG. 1 is a diagram schematically showing a configuration of a femtocell in a mobile communication system in accordance with an embodiment of the present invention.

Referring to FIG. 1, a mobile communication system 100 includes a femtocell base station 110 which covers a femtocell 120, a console terminal 130 which is chosen by the femtocell base station 110, a subscriber terminal 140 which subscribes to a femtocell service provided by the femtocell base station 110, and a non-subscriber terminal 150 which does not subscribe to the femtocell service provided by the femtocell base station 110. Meanwhile, in the mobile communication system 100, the femtocell base station 110, the console terminal 130, the subscriber terminal 140 or the non-subscriber terminal 150 may be present in a macrocell covered by a macro base station 160. The macro base station 160 and the femtocell base station 110 may respectively correspond to the evolved Node-B (eNB) and Home evolved Node-B (HeNB) of a 3rd Generation Partnership Project (3GPP) Long Term Evolution (LTE) mobile communication system.

The femtocell base station 110 sets some or all of the terminals, which are accessing the femtocell base station 110 when the femtocell is initially installed as power is applied to the femtocell base station, as console terminals 130. Then, the femtocell base station 110 receives from the console terminals 130 radio environment parameters related to the surrounding radio environment thereof. Thereafter, the femtocell base station 110 establishes base station information including the operation mode of the femtocell base station 110 and the cell identifier of the femtocell 120 covered by the femtocell base station 110, on the basis of the received radio environment parameters. With the initialization of the femtocell base station 110, an interference between the femtocell base station 110 and the nearby macro base station 160 or other femtocell base stations (not shown) can be minimized by means of frequency and channel selection, power control or the like. Further, the confusion of cell identifiers that may occur during handover can be prevented.

After the base station information of the femtocell base station 110 has been established, the femtocell base station 110 may provide the femtocell service to the terminals 130, 140 and 150 present in the femtocell 120. In this case, the femtocell base station 110 can support a CSG (Closed Subscriber Group) service in which access is allowed only for an authorized user group. In this case, the femtocell 120 is assigned with a CSG ID which is a unique identifier, and is designated as a CSG cell.

Referring to the above description, the femtocell base station 110 may be operated in open user access mode, closed user access mode or mixed user access mode. Open user access mode allows the femtocell service to be provided to all subscribers regardless of whether they have subscribed to CSG or not. Closed user access mode allows the femtocell service to be provided only to CSG subscribers. Mixed user access mode allows different femtocell services in which the close femtocell service is provided to CSG subscribers and the open femtocell service is provided to non-CSG subscribers.

After the base station information including the operation mode has been established, the femtocell base station 110 provides the femtocell service according to the established operation mode. During the femtocell service, the femtocell base station 110 receives, from each terminal which enters the femtocell 120, radio environment parameters related to the radio environment around the terminal to update the base station information so that the service can be continuously provided.

FIG. 2 is a diagram schematically showing the configuration of the femtocell base station 110 and the console terminal 130 in accordance with the embodiment of the present invention.

The femtocell base station 110 includes a console terminal setting unit 212, a communication interface unit 214, a terminal interworking unit 216, and a base station establishment unit 218. The console terminal setting unit 212 sets some or all of the terminals, which are accessing the femtocell base station 110 as power is applied to the femtocell base station, as console terminals 130. The communication interface unit 214 communicates with each console terminal 130 through a wired/wireless interface such as Bluetooth or the like. The terminal interworking unit 216 receives, from the console terminal 130, radio environment parameters related to the surrounding radio environment thereof through the communication interface unit 214. The base station establishment unit 218 establishes the base station information, including the operation mode of the femtocell base station 110 and the cell identifier of the femtocell 120 covered by the femtocell base station 110 based on the received radio environment parameters.

Further, the console terminal 130 includes a reception modem 232 for detecting the radio environment around the console terminal 130 to acquire the radio environment parameters, and a femtocell interworking unit 234 for transmitting the radio environment parameters to the femtocell base station 110.

After a power application to the femtocell base station 110, the console terminal setting unit 212 recognizes that the console terminal setting mode has been designated. Further, the console terminal setting unit 212 detects the terminals 130, 140 and 150 accessing the femtocell base station 110, and then sets some or all of those terminals as console terminals 130.

The communication interface unit 214 receives a request to send transmission data related to the radio environment around each console terminal 130, which has been set in the above-described way, from the terminal interworking unit 216. Then, the communication interface unit 214 sends a data request message for requesting the radio environment parameters to the femtocell interworking unit 234. Thereafter, the communication interface unit 214 receives a reply message, which includes the radio environment parameters, from the femtocell interworking unit 234.

In this case, the terminal interworking unit 216 receives radio environment parameters related to the radio environment around the console terminal 130 from the communication interface unit 214 which has received the reply message.

Further, the base station establishment unit 218 initially establish the base station information and thereafter updates base station information according to the operation mode of the femtocell base station 110.

FIG. 3 is a flowchart showing message transmissions between the femtocell base station 130 and the console terminal 110 in accordance with the present embodiment to acquire radio environment parameters at the femtocell base station 130 from the console terminal 110.

First, the terminal interworking unit 216 of the femtocell base station 110 transmits a request to send transmission data related to the radio environment around the console terminal 130 to the communication interface unit 214 at step S310.

Then, the communication interface unit 214 transmits a data request message for requesting the radio environment parameters to the femtocell interworking unit 234 in the console terminal 130 at step S320.

Thereafter, the femtocell interworking unit 234 transmits a reply message, which includes the radio environment parameters, to the communication interface unit 214 at step S330. Herein, the radio environment parameters have been acquired when the reception modem unit 232 in the console terminal 130 detects the radio environment around the console terminal 130.

Then, the communication interface unit 214 transmits the radio environment parameters related to the radio environment around the console terminal 130 to the terminal interworking unit 216 at step S340.

Hereinafter, processes in which, after the power application to the femtocell base station, the femtocell base station initiates a femtocell service by initializing base station information, updates the base station information, to continue the femtocell service in accordance with the embodiment of the present invention will be described with reference to FIGS. 4 and 5.

Figure 4:
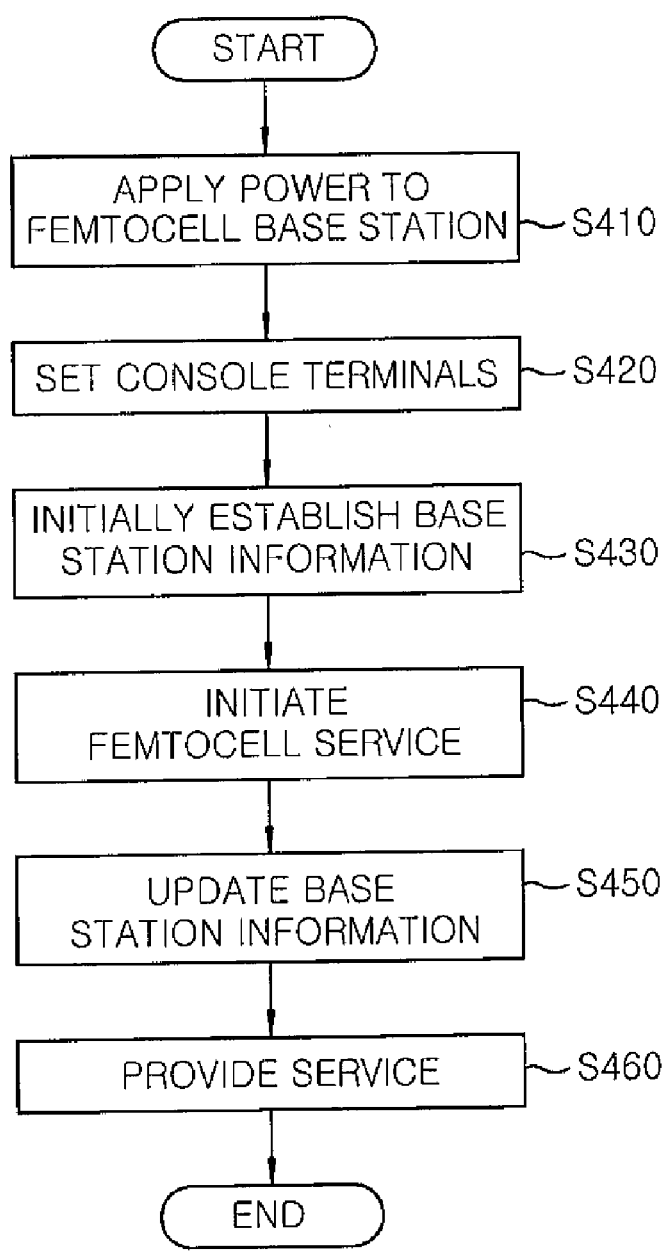
FIG. 4 is a flowchart showing a process in which the femtocell base station provides service after power is applied thereto in accordance with the embodiment of the present invention.

FIG. 4 is a flowchart showing the process in which the femtocell base station provides the femtocell service after the power application thereto in accordance with the present embodiment.

Figure 5:
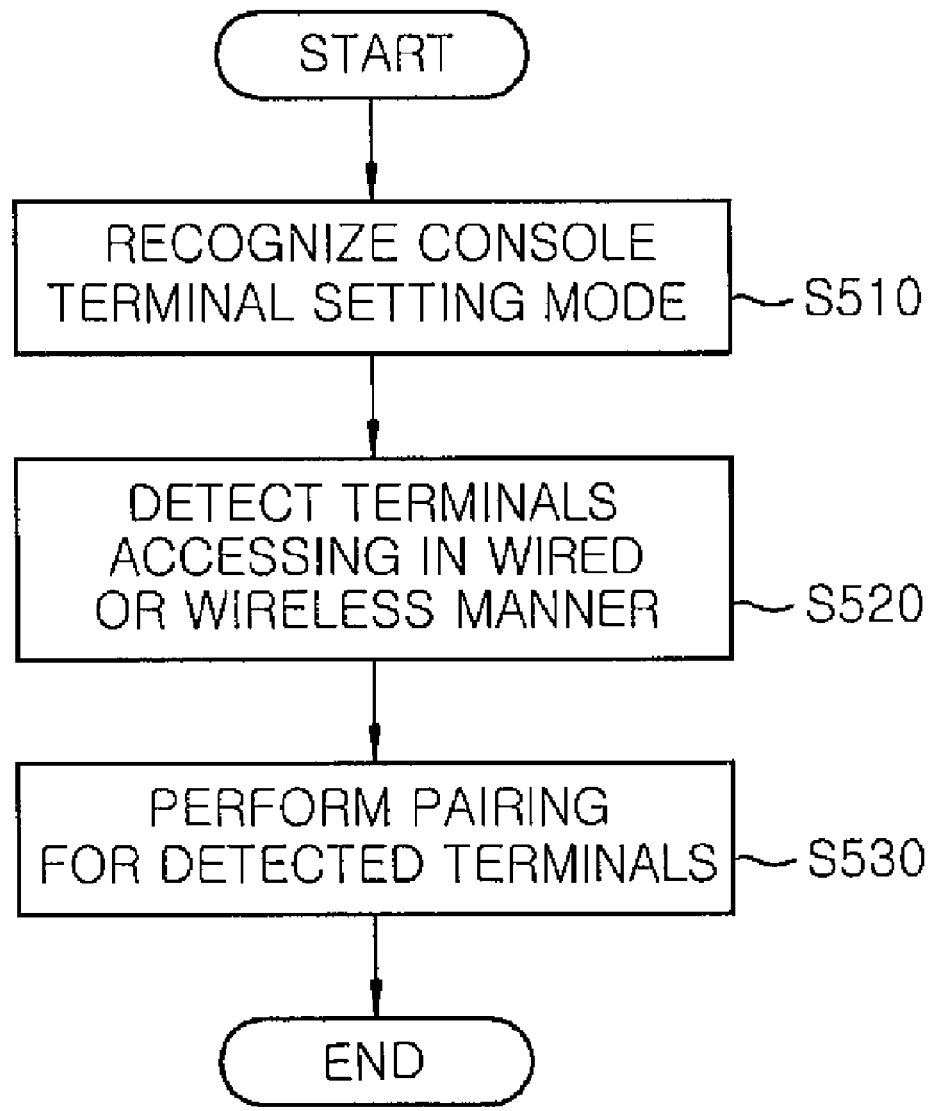
FIG. 5 is a flowchart showing a process in which the femtocell base station sets a console terminal in accordance with the embodiment of the present invention.

FIG. 5 is a flowchart showing the process in which the femtocell base station sets a console terminal in accordance with the present embodiment.

Referring to FIG. 4, first, a power is applied to the femtocell base station 110 at step S410.

Next, upon the power application to the femtocell base station 110, the console terminal setting unit 212 sets some or all of the terminals accessing the femtocell base station 110 as console terminals 130 to initially establish the base station information of the femtocell base station 110 at step S420.

In this case, referring to FIG. 5, the step S420 of setting the console terminals 130 includes the following steps. After power has been applied to the femtocell base station 110, the console terminal setting unit 212 recognizes that a console terminal setting mode has been designated at step S510. Then, the console terminal setting unit 212 detects terminals which currently access the femtocell base station 110 in a wired or wireless manner at step S520. Thereafter, the console terminal setting unit 212 performs a pairing procedure for setting some or all of the detected terminals as console terminals 130 at step S530.

Next, the base station establishment unit 218 initializes base station information at step S430. In this case, the femtocell base station 110 initializes the establishment of the base station configuration such as the connection setup with an Internet Protocol (IP) network for backhaul after the power has been applied. Further, the terminal interworking unit 216 receives the radio environment parameters related to the radio environment around the console terminal 130 from the console terminal 130 through the communication interface unit 214.

Thereafter, the base station establishment unit 218 sets base station information, including the operation mode of the femtocell base station 110 and the cell identifier of the femtocell 120 covered by the femtocell base station 110 based on the received radio environment parameters. As described above by referring to FIG. 3, the transmission/reception of the radio environment parameters through the flow of messages between the femtocell base station 110 and the console terminal 130.

Thereafter, the femtocell base station 110 initiates the femtocell service according to the initially established base station information at step S440.

Further, the base station establishment unit 218 updates the base station information according to the operation mode of the femtocell base station 110 during the femtocell service by the femtocell base station 110 at step S450. Then, the femtocell base station 110 provides the femtocell service based on the updated base station information at step S460.

Hereinafter, a process of updating the base station information according to the operation mode of the femtocell base station in accordance with the embodiment of the present invention will be described in detail with reference to FIGS. 6 to 8.

Figure 6:
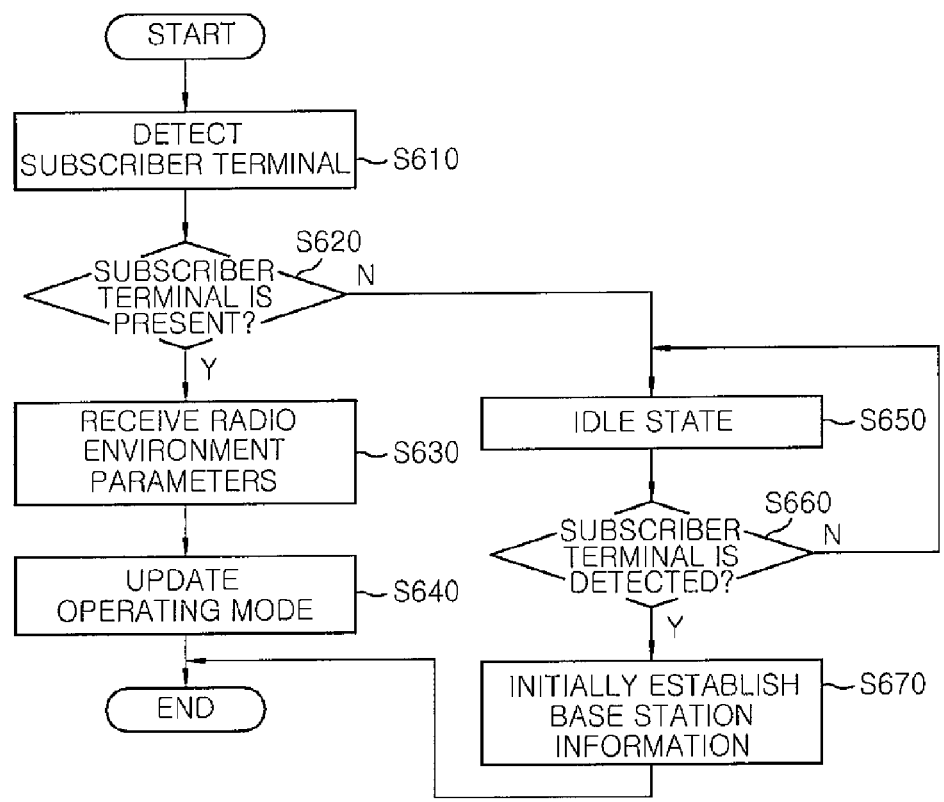
FIG. 6 is a flowchart showing a process of updating base station information of the femtocell base station when the femtocell base station is operated in closed user access mode in accordance with the embodiment of the present invention.

FIG. 6 is a flowchart showing the process of updating base station information of the femtocell base station 110 when the femtocell base station is operated in closed user access mode in accordance with the embodiment of the present invention.

Referring to FIG. 6, when the operation mode of the femtocell base station 110 is closed user access mode, the base station establishment unit 218 detects subscriber terminal accessing the femtocell base station 110 at step S610. Then, the base station establishment unit 218 determines whether a subscriber terminal is present at step S620.

When the subscriber terminal accessing the femtocell base station 110 is detected by the base station establishment unit 218, the terminal interworking unit 216 receives radio environment parameters related to the radio environment around the detected subscriber terminal from the subscriber terminal through the communication interface unit 214 at step S630. The base station establishment unit 218 updates the base station information including the operation mode on the basis of the radio environment parameters at step S640.

When a subscriber terminal is not present at step S620, the femtocell base station 110 switches to an idle state at step S650, and performs only minimal maintenance operations such as increasing the broadcasting period of the femtocell base station 110. While the femtocell base station 110 is in the idle state, the base station establishment unit 218 determines whether a subscriber terminal has been detected at step S660.

When no subscriber terminal is detected, the femtocell base station 110 stays in the idle state at step S650. On the other hand, when a subscriber terminal is detected, the femtocell base station 110 switches back to an active state, and then the base station establishment unit 218 initializes the base station information, including the operation mode of the femtocell base station 110, at step S670.

Figure 7:
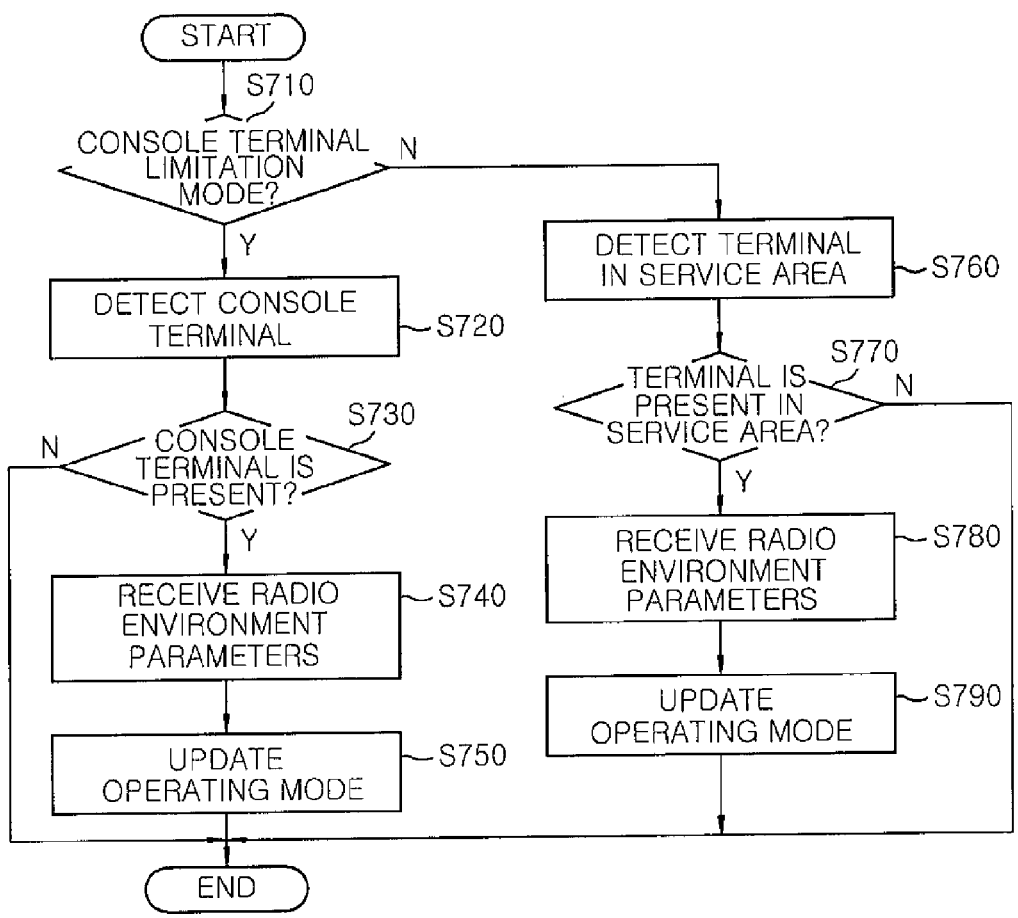
FIG. 7 is a flowchart showing a process of updating base station information of the femtocell base station when the femtocell base station is operated in open user access mode in accordance with the embodiment of the present invention.

FIG. 7 is a flowchart showing the process of updating base station information of the femtocell base station when the femtocell base station is operated in open user access mode in accordance with the embodiment of the present invention.

Referring to FIG. 7, when the operation mode of the femtocell base station 110 is open user access mode, the base station establishment unit 218 determines whether the current mode is console terminal limitation mode in which radio environment parameters are supposed to be provided only through a console terminal at step S710.

When the current mode corresponds to console terminal limitation mode, the base station establishment unit 218 detects a console terminal which is accessing the femtocell base station 110 at step S720. Then, the base station establishment unit 218 determines whether the console terminal is present at step S730. When the console terminal accessing the femtocell base station 110 is detected by the base station establishment unit 218, the terminal interworking unit 216 receives radio environment parameters related to the radio environment around the detected console terminal from the console terminal through the communication interface unit 214 at step S740. The base station establishment unit 218 updates the base station information including the operation mode on the basis of the radio environment parameters at step S750.

In contrast, when a console terminal is not present at step 730, the base station establishment unit 218 does not separately receive radio environment parameters to update the operation mode.

Meanwhile, when the current mode is not console terminal limitation mode at step 710, the base station establishment unit 218 detects a terminal in a service area of the femtocell 120 at step S760, and then determines whether the terminal is present in the service area at step S770. When the terminal accessing the femtocell base station 110 is detected, the terminal interworking unit 216 receives radio environment parameters related to the radio environment around the detected terminal from the detected terminal through the communication interface unit 214 at step S780. The base station establishment unit 218 updates the base station information including the operation mode on the basis of the radio environment parameters at step S790. In contrast, when a terminal is not present at step S770, the base station establishment unit 218 does not separately receive radio environment parameters to update the operation mode.

Figure 8:
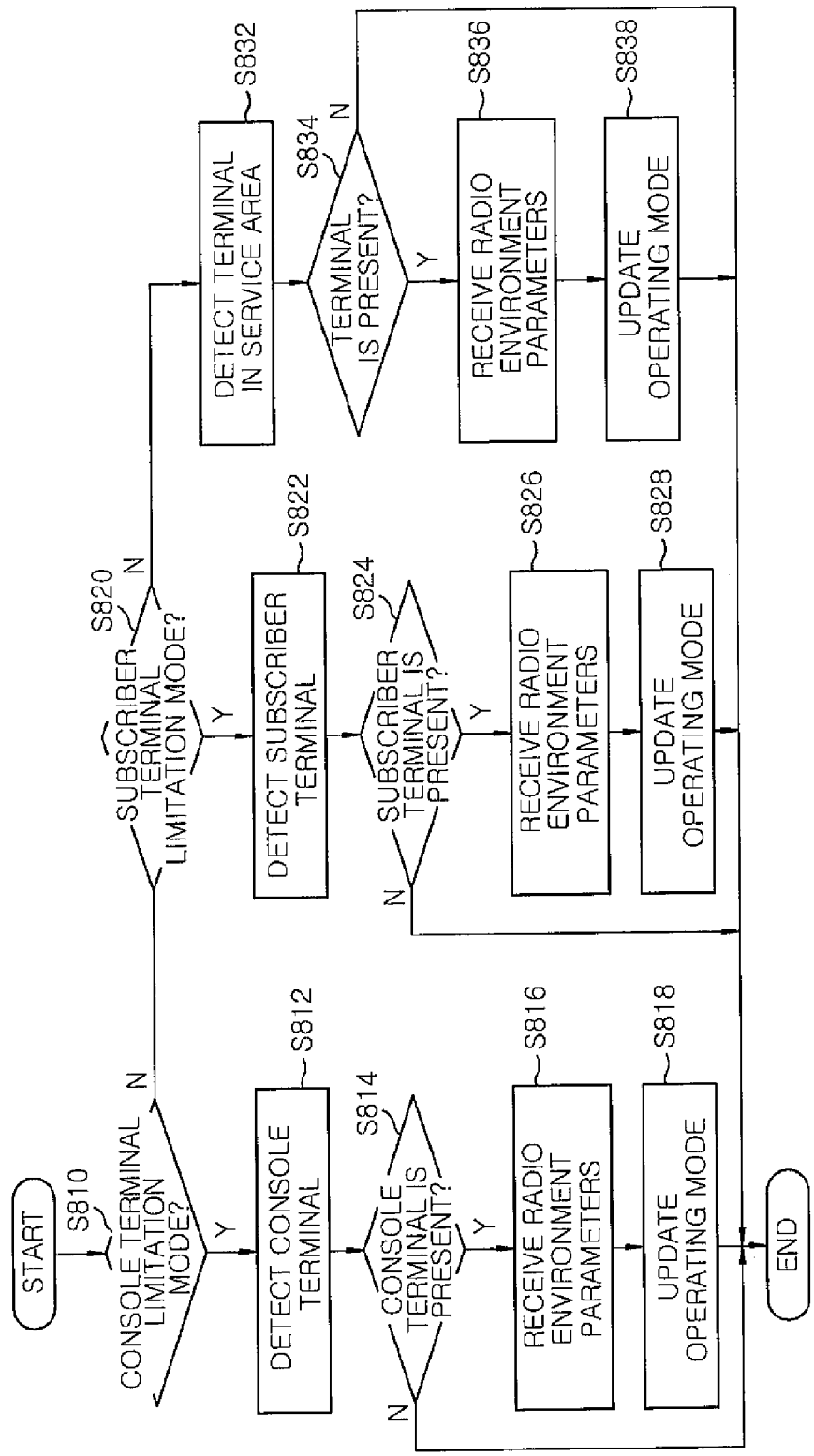
FIG. 8 is a flowchart showing a process of updating base station information of the femtocell base station when the femtocell base station is operated in mixed user access mode in accordance with the embodiment of the present invention.

FIG. 8 is a flowchart showing the process of updating base station information of the femtocell base station when the femtocell base station is operated in mixed user access mode in accordance with the embodiment of the present invention.

Referring to FIG. 8, when the operation mode of the femtocell base station 110 is mixed user access mode, the base station establishment unit 218 determines whether the current mode is console terminal limitation mode in which radio environment parameters are supposed to be provided only through a console terminal at step S810.

When the current mode corresponds to console terminal limitation mode, the base station establishment unit 218 detects a console terminal accessing the femtocell base station 110 at step S812. Then, the base station establishment unit 218 determines whether the console terminal is present or not at step S814. When the console terminal accessing the femtocell base station 110 is detected by the base station establishment unit 218, the terminal interworking unit 216 receives radio environment parameters related to the radio environment around the detected console terminal from the console terminal through the communication interface unit 214 at step S816. Thereafter, the base station establishment unit 218 updates the base station information including the operation mode on the basis of the radio environment parameters at step S818. However, if a console terminal is not present at step S814, the terminal interworking unit 216 does not separately receive radio environment parameters to update the operation mode.

Meanwhile, when the current mode is not the console terminal limitation mode at step S810, the base station establishment unit 218 determines whether the current mode is subscriber terminal limitation mode in which radio environment parameters are supposed to be provided only through a subscriber terminal or not at step S820.

When the current mode is subscriber terminal limitation mode, the base station establishment unit 218 detects a subscriber terminal accessing the femtocell base station 110 at step S822. Then, the base station establishment unit determines whether the subscriber terminal is present or not at step S824. When the subscriber terminal accessing the femtocell base station 110 is detected by the base station establishment unit 218, the terminal interworking unit 216 receives radio environment parameters related to the radio environment around the detected subscriber terminal from the detected subscriber terminal through the communication interface unit 214 at step S826. Thereafter, the base station establishment unit 218 updates the base station information including the operation mode on the basis of the radio environment parameters at step S828.

When a subscriber terminal is not present at step S824, the base station establishment unit 218 does not separately receive radio environment parameters to update the operation mode.

Meanwhile, when the current mode is not subscriber terminal limitation mode, the base station establishment unit 218 detects a terminal accessing the femtocell base station 110 at step S832. Then, the base station establishment unit 218 determines whether the terminal is present in the service area of the femtocell 120 at step S834. When the terminal accessing the femtocell base station 110 is detected by the base station establishment unit 218, the terminal interworking unit 216 receives radio environment parameters related to the radio environment around the detected terminal from the terminal through the communication interface unit 214 at step S836. Thereafter, the base station establishment unit 218 updates the base station information including the operation mode on the basis of the radio environment parameters at step S838. In contrast, when a terminal is not present in the service area of the femtocell 120 at step S834, the base station establishment unit 218 does not separately receive radio environment parameters to update the operation mode.

The embodiments of the present invention may be implemented in the form of a program instruction that can be executed by various types of computer means, and may be recorded on computer-readable recording media. The computer-readable recording media may include program instructions, a data file or a data structure, independently or in a combination thereof. The media may also be designed and configured especially for the present invention, or alternatively may be well known and used by those skilled in the art of computer software. Examples of computer-readable recording media may include magnetic media such as a hard disk, a floppy disk, and magnetic tape, optical media such as Compact Disk-Read Only Memory (CD-ROM), and a Digital Versatile Disk (DVD), magneto-optical media such as a floptical disk, and hardware devices such as ROM, Random Access Memory (RAM), and flash memory which are specially configured to store and execute program instructions. The media may be light including carrier waves for transmitting signals required to designate program instructions, data structures, etc., or transmission media such as a metallic line and a waveguide. Examples of program instructions include high-level language code that can be executed by a computer using an interpreter or the like, as well as machine language code such as that created by a compiler.

In accordance with the embodiments of the present invention, there is an advantage in that console terminals are set in a femtocell, and radio environment parameters related to surrounding radio environment are received from the console terminal, so that base station information of a femtocell base station is established and provided, thus efficiently realizing Self Organizing Network (SON) communication.

Further, according to embodiments of the present invention, there is an advantage in that the time and effort required to install a femtocell at the request of a user can be reduced, thus decreasing the costs of a femtocell service provider and improving service quality for a user.

While the invention has been shown and described with respect to the preferred embodiments, it will be understood by those skilled in the art that various changes and modifications may be made without departing from the scope of the invention as defined in the following claims.

What is claimed is:

1. A femtocell base station, comprising:
a console terminal setting unit for, upon a power application to the femtocell base station, setting all or some of terminals accessing the femtocell base station as console terminals; a communication interface unit for communicating with each of the console terminals; a terminal interworking unit for receiving a first radio environment parameter related to a radio environment around the console terminal from the console terminals through the communication interface unit; and
a base station establishment unit for establishing base station information including an operation mode of the femtocell base station and a cell identifier of a femtocell covered by the femtocell base station, based on the first radio environment parameter~
wherein the base station establishment unit updates the base station information
according to the operation mode of the femtocell base station, and wherein:
when the femtocell base station is operated in a closed user access mode, the base station establishment unit detects a subscriber terminal accessing the femtocell base station,
when the subscriber terminal accessing the femtocell base station is detected by the base station establishment unit, the terminal interworking unit receives a second radio environment parameter related to a radio environment around the detected subscriber terminal from the detected subscriber terminal through the communication interface unit, and
the base station establishment unit updates the base station information based on the second radio environment parameter.

2. The femtocell base station of claim 1, wherein the console terminal setting unit detects terminals accessing the femtocell base station when a designation of console terminal setting mode is recognized to thereby set some or all of the detected terminals as console terminals.

3. The femtocell base station of claim 1, wherein:
the communication interface unit receives a request to send transmission data related to the radio environment around the console terminal from the terminal interworking unit, sends a data request message for requesting the first radio environment parameter to the console terminal, and receives a reply message including the first radio environment parameter from the console terminal; and
the terminal interworking unit receives the radio environment parameters from the communication interface unit.

4. A femtocell base station, comprising:
a console terminal setting unit for, upon a power application to the femtocell base station, setting all or some of terminals accessing the femtocell base station as console terminals;
a communication interface unit for communicating with each of the console terminals;
a terminal interworking unit for receiving a first radio environment parameter related to a radio environment around the console terminal from the console terminals through the communication interface unit; and
a base station establishment unit for establishing base station information including an operation mode of the femtocell base station and a cell identifier of a femtocell covered by the femtocell base station, based on the first radio environment parameter,
wherein the base station establishment unit updates the base station information according to the operation mode of the femtocell base station, and
wherein:
when the femtocell base station is operated in an open user access mode and the open user access mode corresponds to a console terminal limitation mode, the base station establishment unit detects a console terminal accessing the femtocell base station;
when the console terminal accessing the femtocell base station is detected by the base station establishment unit, the terminal interworking unit receives a second radio environment parameter related to a radio environment around the detected console terminal from the detected console terminal through the communication interface unit, and
the base station establishment unit updates the base station information based on the second radio environment parameter.

5. The femtocell base station of claim 4, wherein:
when the femtocell base station is operated in an open user access mode and the open user access mode does not correspond to console terminal limitation mode, the base station establishment unit detects a terminal which is accessing the femtocell base station,
when the terminal accessing the femtocell base station is detected by the base station establishment unit, the terminal interworking unit receives a third radio environment parameter related to a radio environment around the detected terminal from the detected terminal through the communication interface unit, and
the base station establishment unit updates the base station information based on the third radio environment parameter.

6. A femtocell base station, comprising:
a console terminal setting unit for, upon a power application to the femtocell base station, setting all or some of terminals accessing the femtocell base station as console terminals;
a communication interface unit for communicating with each of the console terminals;
a terminal interworking unit for receiving a first radio environment parameter related to a radio environment around the console terminal from the console terminals through the communication interface unit; and
a base station establishment unit for establishing base station information including an operation mode of the femtocell base station and a cell identifier of a femtocell covered by the femtocell base station, based on the first radio environment parameter,
wherein the base station establishment unit updates the base station information according to the operation mode of the femtocell base station, and
wherein:
when the femtocell base station is operated in a mixed user access mode and the mixed user access mode corresponds to a console terminal limitation mode, the base station establishment unit detects a console terminal accessing the femtocell base station,
when the console terminal accessing the femtocell base station is detected by the base station establishment unit, the terminal interworking unit receives a second radio environment parameter related to a radio environment around the detected console terminal from the detected console terminal through the communication interface unit, and
the base station establishment unit updates the base station information based on the second radio environment parameter.

7. The femtocell base station of claim 6, wherein:
when the femtocell base station is operated in a mixed user access mode and the mixed user access mode does not correspond to a consol terminal limitation mode but corresponds to a subscriber terminal limitation mode, the base station establishment unit detects a subscriber terminal accessing the femtocell base station,
when the subscriber terminal accessing the femtocell base station is detected by the base station establishment unit, the terminal interworking unit receives a third radio environment parameter related to a radio environment around the detected subscriber terminal from the detected subscriber terminal through the communication interface unit, and
the base station establishment unit updates the base station information based on the third radio environment parameter.

8. The femtocell base station of claim 6, wherein:
when the femtocell base station is operated in mixed user access mode and the mixed user access mode does not correspond to both of a console terminal limitation mode and a subscriber terminal limitation mode, the base station establishment unit detects a terminal accessing the femtocell base station,
when the terminal which is accessing the femtocell base station is detected by the base station establishment unit, the terminal interworking unit receives a third radio environment parameter related to a radio environment around the detected terminal from the detected terminal through the communication interface unit, and
the base station establishment unit updates the base station information based on the third radio environment parameter.

* * * * *